US012728796B2

(12) United States Patent
Kaufman et al.

(10) Patent No.: US 12,728,796 B2
(45) Date of Patent: Sep. 8, 2026

(54) REVERSING ASSIST SYSTEM FOR A MINING TRUCK

(71) Applicant: Caterpillar Global Mining Equipment LLC, Denison, TX (US)

(72) Inventors: Benjamin Devers Kaufman, Tucson, AZ (US); Camilo Andres Galofre, Oro Valley, AZ (US); Cameron Thomas Lane, Oro Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 182 days.

(21) Appl. No.: 18/677,997

(22) Filed: May 30, 2024

(65) Prior Publication Data

US 2025/0368133 A1 Dec. 4, 2025

(51) Int. Cl.
*B60R 1/26* (2022.01)
*B60P 1/04* (2006.01)

(52) U.S. Cl.
CPC .................................... *B60R 1/26* (2022.01); *B60P 1/04* (2013.01); *B60R 2300/308* (2013.01)

(58) Field of Classification Search
None
See application file for complete search history.

(56) References Cited

U.S. PATENT DOCUMENTS

| | | | | |
|---|---|---|---|---|
| 8,218,007 | B2 | 7/2012 | Lee et al. | |
| 8,441,536 | B2 | 5/2013 | Imanishi et al. | |
| 8,599,043 | B2 | 12/2013 | Kadowaki et al. | |
| 10,131,276 | B2 | 11/2018 | Nagasawa et al. | |
| 10,228,232 | B2 | 3/2019 | Friend et al. | |
| 10,744,942 | B2 | 8/2020 | Kadowaki et al. | |
| 10,889,324 | B2 | 1/2021 | Matsumoto et al. | |
| 11,842,450 | B2 | 12/2023 | Gibson et al. | |
| 2016/0207459 | A1 | 7/2016 | Niem et al. | |
| 2018/0370432 | A1 * | 12/2018 | Imaizumi .................. | E02F 3/34 |
| 2021/0043085 | A1 * | 2/2021 | Kreiling .................... | E02F 3/96 |

FOREIGN PATENT DOCUMENTS

| | | | |
|---|---|---|---|
| JP | 2011195051 | A * | 10/2011 |
| JP | 5380735 | B2 | 1/2014 |

* cited by examiner

*Primary Examiner* — Rebecca A Volentine

(57) ABSTRACT

A reversing assist system for a mining truck is described. The reversing assist system includes an image capturing device to capture a wide angled view of a rearward field of the mining truck including portions of two rear tires and portions of a rear end of a dump body of the mining truck. The reversing assist system includes a controller configured to overlay a first static indicator and a second static indicator on the video feed of the wide angled view. The first static indicator spans an inner distance between the two rear tires and the second static indicator represents portions of an outer periphery of the mining truck. The controller is configured to overlay a dynamic indicator on the video feed that dynamically changes to predict a rearward path of the mining truck on the video feed based on an angular movement of the mining truck.

20 Claims, 6 Drawing Sheets

REVERSING ASSIST SYSTEM FOR A MINING TRUCK

TECHNICAL FIELD

The present disclosure relates to a reversing assist system for a mining truck and a method for assisting with reversing the mining truck.

BACKGROUND

In work machines, rearview camera systems are increasingly employed to provide operators with a view of the machine's rearward field, e.g., when reversing the work machine. Currently, the rearview camera systems typically utilize a wide-angle camera that maximizes the viewable area to provide a wide-angle view to the operators of the work machines. However, the usage of the wide-angle camera can compromise depth perception and make it difficult to distinguish distances between objects and the work machine for some machine operators.

Japanese Patent Publication No. 5380735 provides a rear view display system for a transport vehicle that captures a field of view behind the vehicle body with a camera attached to the rear of the vehicle body of the transport vehicle having a vessel and displays the captured image on a display unit provided in a driver's cab.

SUMMARY OF THE INVENTION

In an aspect, the present disclosure relates to a reversing assist system for a mining truck. The reversing assist system includes an image capturing device to capture a wide angled view of a rearward field of the mining truck including portions of at least two rear tires of the mining truck and portions of a rear end of a dump body of the mining truck. The reversing assist system further includes a controller operatively coupled to the image capturing device. The controller is configured to obtain a video feed of the wide angled view of the rearward field captured by the image capturing device and overlay a first static indicator and a second static indicator on the video feed. The first static indicator spans, at least partially, an inner distance between the at least two rear tires of the mining truck and the second static indicator represents portions of an outer periphery of the mining truck. The controller is further configured to overlay a dynamic indicator on the video feed that dynamically changes to predict a rearward path of the mining truck on the video feed based on an angular movement of the mining truck in a rearward direction.

In another aspect, the present disclosure relates to a method for assisting with reversing a mining truck. The method includes mounting an image capturing device to capture a wide angled view of a rearward field of the mining truck including portions of at least two rear tires of the mining truck and portions of a rear end of a dump body of the mining truck. The method further includes obtaining, by a controller, a video feed of the wide angled view of the rearward field captured by the image capturing device and overlaying, by the controller, a first static indicator and a second static indicator on the video feed. The first static indicator spans, at least partially, an inner distance between the at least two rear tires of the mining truck and the second static indicator represents portions of an outer periphery of the mining truck. Further the method includes overlaying, by the controller, a dynamic indicator on the video feed that dynamically changes to predict a rearward path of the mining truck on the video feed based on an angular movement of the mining truck in a rearward direction.

In yet another aspect, the present disclosure relates to a mining truck. The mining truck includes at least two rear tires, a dump body supported on the at least two rear tires, and a reversing assist system. The dump body defines a rear end. The reversing assist system includes an image capturing device to capture a wide angled view of a rearward field of the mining truck including portions of the at least two rear tires of the mining truck and portions of the rear end. The reversing assist system further includes a controller operatively coupled to the image capturing device. The controller is configured to obtain a video feed of the wide angled view of the rearward field captured by the image capturing device and overlay a first static indicator and a second static indicator on the video feed. The first static indicator spans, at least partially, an inner distance between the at least two rear tires of the mining truck and the second static indicator represents portions of an outer periphery of the mining truck. The controller is further configured to overlay a dynamic indicator on the video feed that dynamically changes to predict a rearward path of the mining truck on the video feed based on an angular movement of the mining truck in a rearward direction.

BRIEF DESCRIPTION

Figure 1:
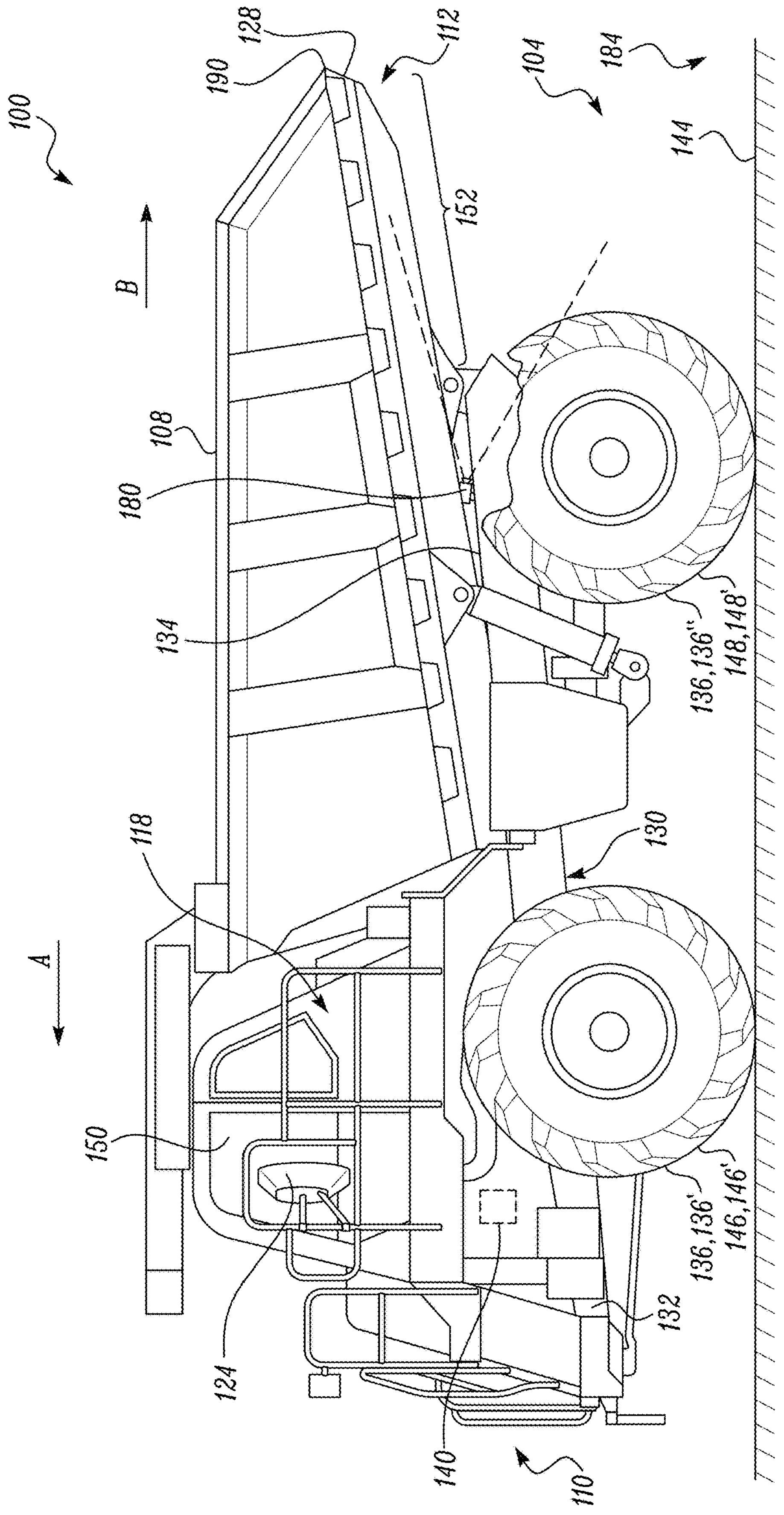
FIG. 1 is a side view of an exemplary mining truck, in accordance with one or more aspects of the present disclosure.
Figure 2:
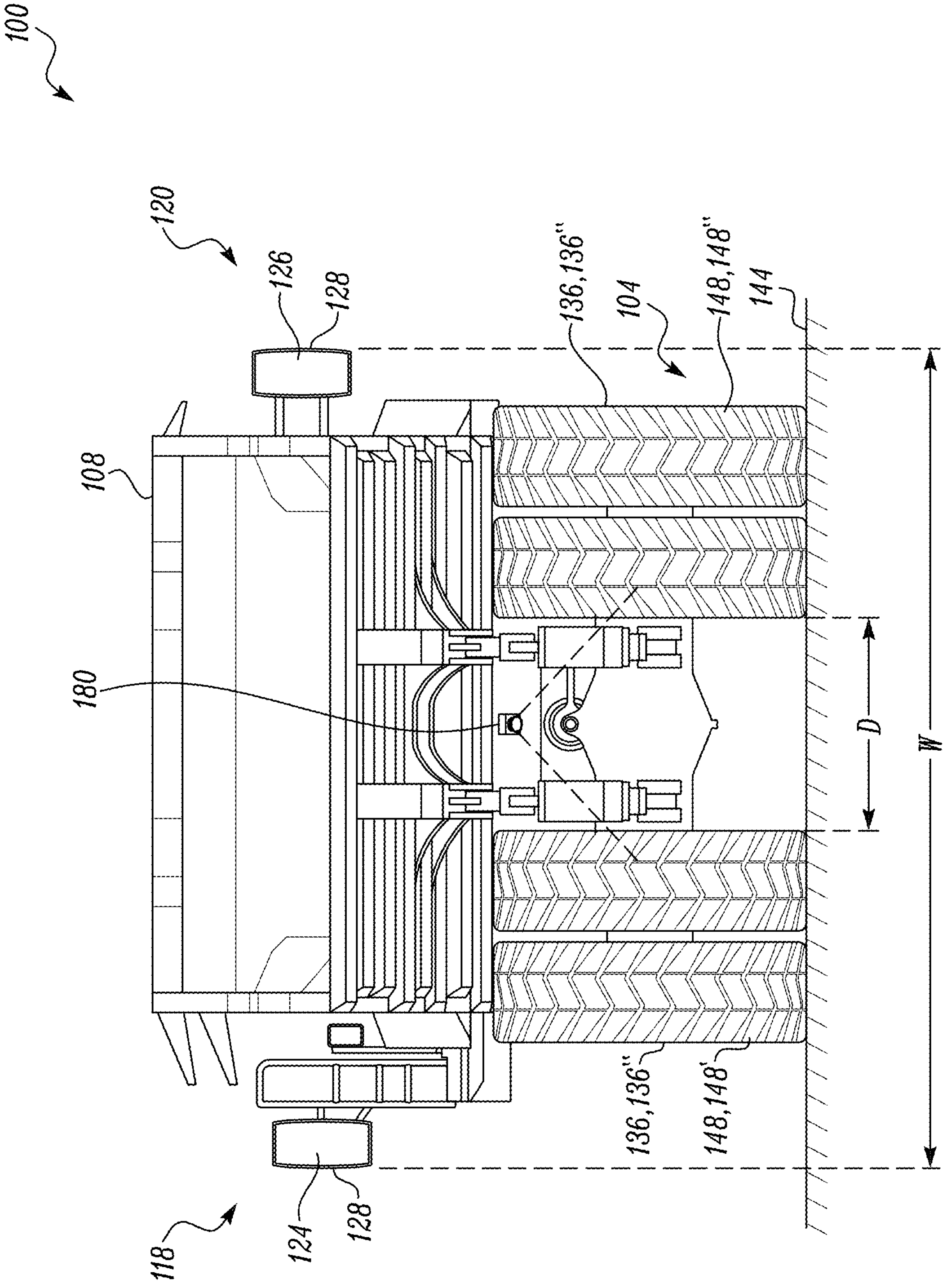
FIG. 2 is a rear view of the exemplary mining truck, in accordance with one or more aspects of the present disclosure.
Figure 4:
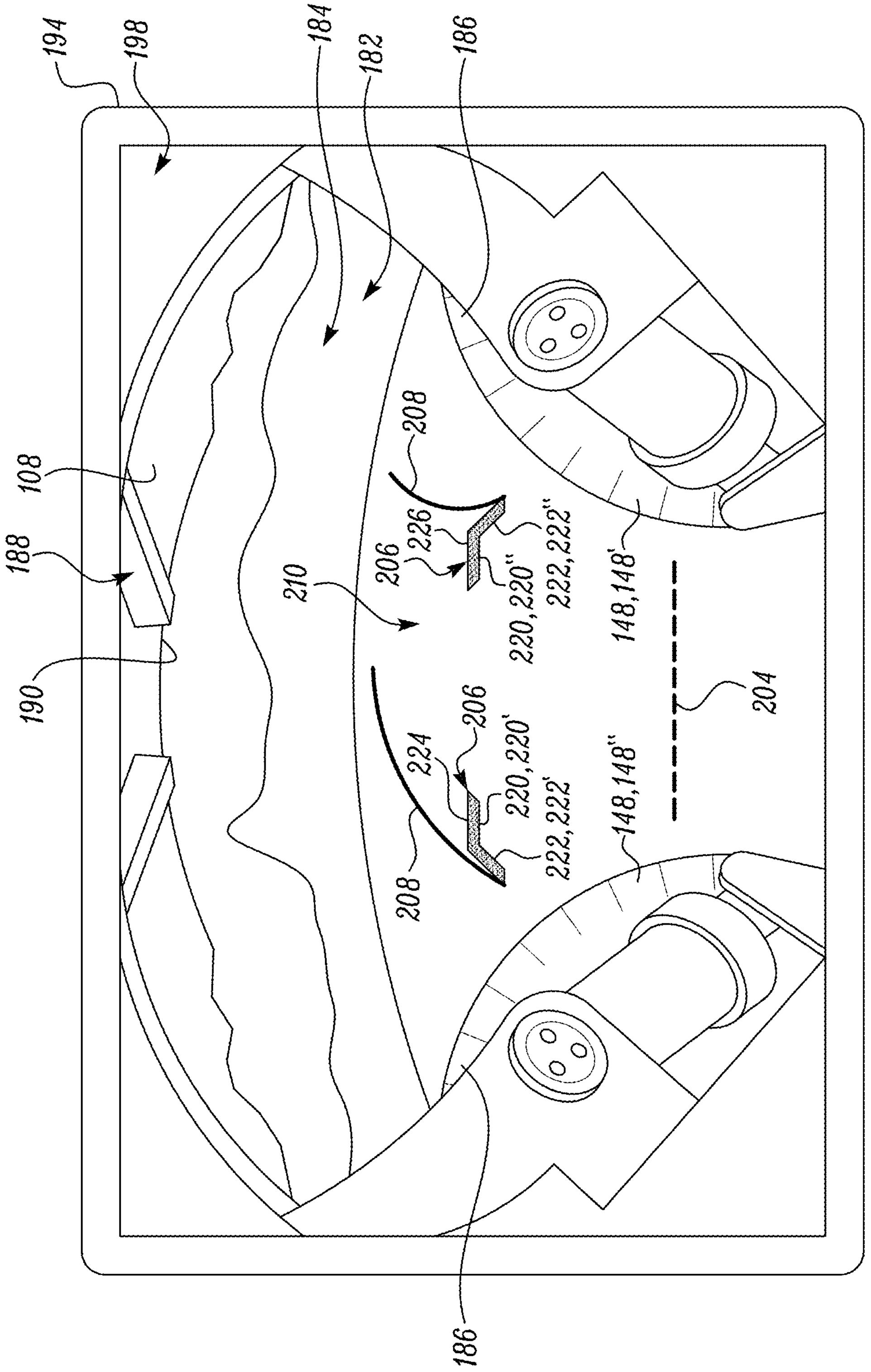
Figure 5:
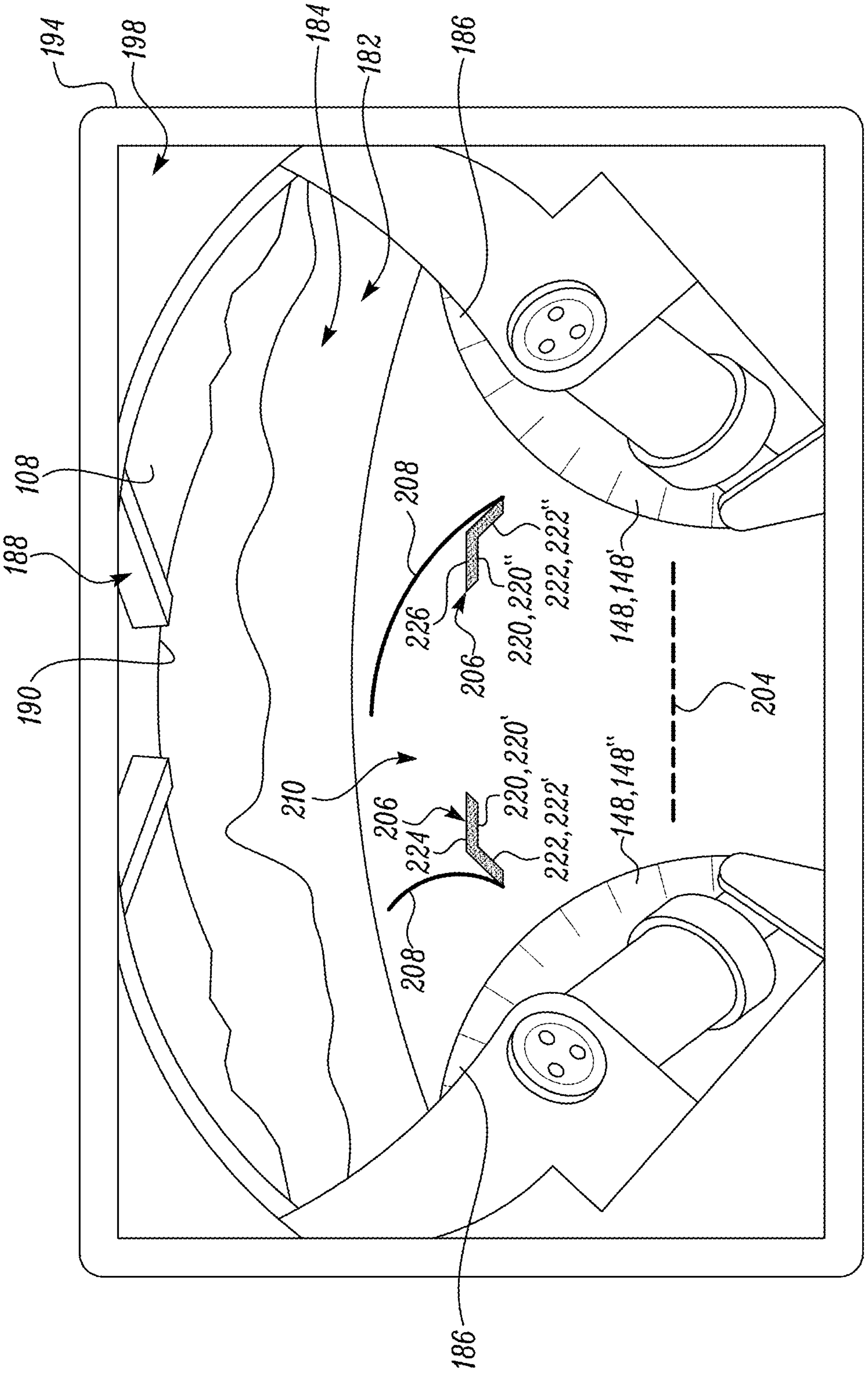
Figure 6:
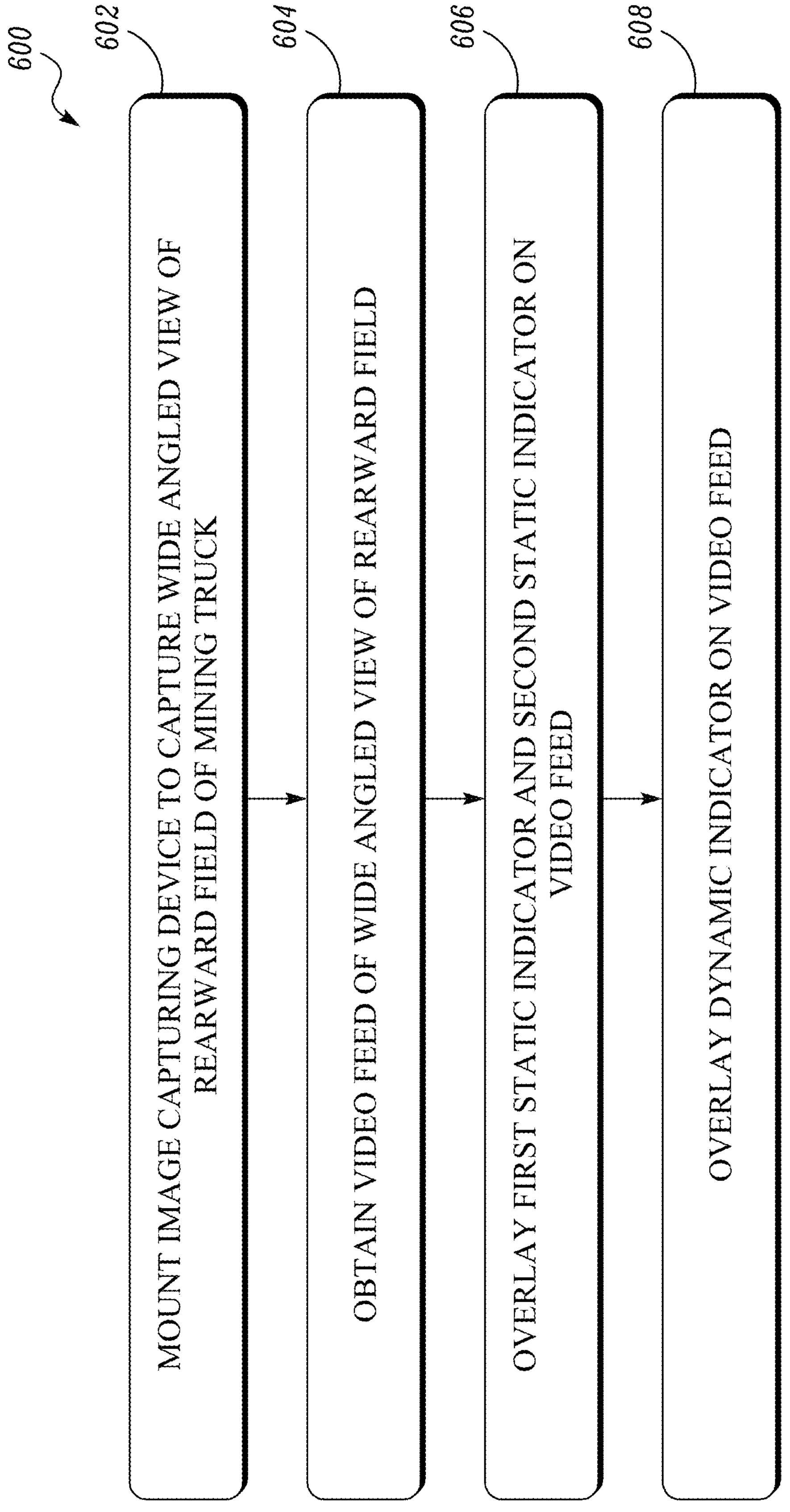

FIGS. 4 and 5 illustrate a first static indicator, a second static indicator, and a dynamic indicator displayed on a display screen of the mining truck of FIGS. 1 and 2, in accordance with one or more aspects of the present disclosure; and FIG. 6 illustrates an exemplary method for assisting with reversing the mining truck of FIGS. 1 and 2, in accordance with one or more aspects of the present disclosure.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Referring to FIGS. 1 and 2, a mining truck 100 is shown. The mining truck 100 may exemplarily embody a dump truck or a large mining truck operable at a worksite 104. The worksite 104 may include various sites or locations, such as load locations and dump locations (not shown). Load locations may be locations of the worksite 104 from where the mining truck 100 may receive a payload (e.g., ores, boulders, sand, dirt, gravel, etc.), and dump locations may be locations of the worksite 104 to where the mining truck 100 may traverse up to so as to release the payload.

As part of an exemplary work cycle, the mining truck 100 may repeatedly traverse back and forth between said locations at the worksite 104. For example, the mining truck 100 may receive the payload from a load location, traverse in a forward direction (see direction, A, FIG. 1) from the load location to a dump location and traverse back to the load location or (one or more similar other load locations) to receive additional payload for a desired number of instances. In some instances, the mining truck 100 may have to move in a rearward direction (see direction, B, FIG. 1) during a payload transfer work cycle, e.g., to more accurately arrive at a payload dump site or at a payload receiving site. The mining truck 100 may include a dump body 108 which may be tiltable to receive and release the payload.

The mining truck 100 may define a front end 110 and a rear end 112. The rear end 112 may be located opposite to the front end 110. The front end 110 may lead the rear end 112 when the mining truck 100 is travelling in the forward direction (e.g., direction, A, FIG. 1). A left hand side 118 of the mining truck 100 and a right hand side 120 of the mining truck 100 may define a width, W, of the mining truck 100. Each of the left hand side 118 and the right hand side 120 may be defined on the lateral opposing sides of the mining truck 100. Said left hand side 118 and right hand side 120 can be relatable and understood when viewing the mining truck 100 from the rear end 112 towards the front end 110. In some embodiments, the mining truck 100 may include a pair of side mirrors (or a pair of side rear view mirrors), for example, a left side mirror 124 and a right side mirror 126 installed on the left hand side 118 and the right hand side 120, respectively, of the mining truck 100. The left side mirror 124 and the right side mirror 126 enable an operator stationed on the mining truck 100 to view and/or inspect an environment and/or a ground surface 144 surrounding the mining truck 100 (e.g., respectively towards the left hand side 118 and the right hand side 120 of the mining truck 100). The front end 110, the rear end 112, the left hand side 118, the right hand side 120, the left side mirror 124, and the right side mirror 126 of the mining truck 100 may define an outer periphery 128 of the mining truck 100. In some embodiments, the width, W, may be defined between the left side mirror 124 and the right side mirror 126. The annotation of the outer periphery 128 as visualized in FIGS. 1 and 2 may correspond to multiple portions of the outer periphery 128 of the mining truck 100. As an example, in FIG. 1, the outer periphery 128 is annotated as the rear end 190 of the dump body 108 and in FIG. 2, the outer periphery 128 is annotated as the left side mirror 124 and the right side mirror 126 of the mining truck 100.

Further, the mining truck 100 may include a chassis or a main frame 132 and multiple traction devices (see traction devices 136). The traction devices 136 may include front traction devices 136' that are located towards the front end 110 of the mining truck 100 and rear traction devices 136" that are located towards the rear end 112 of the mining truck 100. The mining truck 100 may further include a power system 140, which may include a power source (not shown) such as, but not limited to, an internal combustion engine and/or a battery, to provide motive power to the traction devices 136, and, optionally, to one or more other systems/sub-systems of the mining truck 100. By providing motive power to the traction devices 136, the traction devices 136 can move (e.g., rotate) with respect to the ground surface 144 of the worksite 104, thus also enabling the mining truck 100 to move with respect to the ground surface 144 and travel between the various locations of the worksite 104.

The traction devices 136 of the mining truck 100 (i.e., each of the front traction devices 136' and the rear traction devices 136) may support the main frame 132 on the ground surface 144 of the worksite 104. The front traction devices 136' may include a set of front tires 146 and the rear traction devices 136" may include a set of rear tires 148. In some embodiments, the traction devices 136 can include crawler tracks either alone or in combination with one or more of the set of front tires 146 and/or the set of rear tires 148. The set of front tires 146 may support a front portion 130 of the main frame 132 on the ground surface 144, while the set of rear tires 148 may support a rear portion 134 of the main frame 132 carrying the dump body 108 on the ground surface 144. According to an example implementation, a rear end 190 of the dump body 108 extends further rearwards and away from the set of rear tires 148 to define a rearward overhang 152 of the mining truck 100 spanning over and beyond in the rearward direction of the set of rear tires 148, as shown.

As exemplarily shown, the set of rear tires 148 may also be disposed along the width, W, of the mining truck 100 such that at least one rear tire (e.g., see left rear tire 148') of the set of rear tires 148 can occupy a position at or towards the left hand side 118 of the mining truck 100 and at least one another rear tire (e.g., see right rear tire 148") of the set of rear tires 148 can occupy a position at or towards the right hand side 120 of the mining truck 100. Similarly, the set of front tires 146 may be disposed along the width, W, of the mining truck 100 such that at least one front tire (e.g., see left front tire 146') of the set of front tires 146 can occupy a position at or towards the left hand side 118 of the mining truck 100 and at least one another front tire (not shown) of the set of front tires 146 can occupy a position at or towards the right hand side 120 of the mining truck 100.

Also, the mining truck 100 may include an operator cab 150 located towards the front end 110 of the mining truck 100. The operator cab 150 may include one or more operator seats and various input devices, such as steering wheels, joysticks, control panels, and levers. The input devices may be accessed to control and operate various systems and/or sub-systems of the mining truck 100, e.g., the power system 140, a steering input device 154 (for example, a steering wheel shown in FIG. 3) to steer the traction devices 136 (and thus the mining truck 100), etc. In some embodiments, the mining truck 100 may include a sensor 192 (shown in FIG. 3) coupled to the steering input device 154 (shown in FIG. 3) to determine a change in an angular positioning of the steering input device 154 (shown in FIG. 3) of the mining truck 100. The operator cab 150 may further include one or more output devices, such as, a display screen 194 (shown in FIG. 3), a speaker, and so on. The output device, for example, the display screen 194 displays a rearward field 184 (shown in FIGS. 4 and 5) of the mining truck 100 when the mining truck 100 is moving in the rearward direction (see direction, B, FIG. 1). For ease of understanding, the rearward field 184 may refer to an area behind the mining truck 100.

In accordance with various embodiments, the mining truck 100 includes an image capturing device 180 to capture a view, e.g., a wide angled view 182 (shown in FIGS. 4 and 5) of the rearward field 184 (shown in FIGS. 4 and 5) of the mining truck 100 when the mining truck 100 is moving in the rearward direction (see direction, B, FIG. 1). For example, as shown in FIGS. 4 and 5, the wide angled view 182 of the rearward field 184 of the mining truck 100 includes portions 186 of at least two rear traction devices (such as, the left rear tire 148 and the right rear tire 148) of the mining truck 100 and portions 188 of the rear end 190 (e.g., portions of the rearward overhang 152) of the dump body 108 of the mining truck 100. In accordance with various embodiments, the image capturing device 180 is positioned under the dump body 108, for example, on the rear portion 134 of the main frame 132, of the mining truck 100. Additionally, or optionally, in some embodiments, the image capturing device 180 is mounted between the left rear tire 148' and the right rear tire 148 of the mining truck 100. The image capturing device 180 may include a camera or any device capable of capturing the wide angled view 182 of the rearward field 184 of the mining truck 100. For example, the wide angled view 182 corresponds to a view that captures a larger/wider area as compared to a standard view provided by any standard image capturing device 180.

Although references and illustrations of the mining truck 100 are used in the present disclosure, one or more aspects of the present disclosure may also be applicable to other work machines, such as underground mining machines, excavators, articulated dump trucks, haul trucks, loaders, wheeled machines, crawler machines, and the like machines, in which movement in a rearward direction (such as the rearward direction B, FIG. 1) is possible. References and illustrations of the mining truck 100 in the present disclosure is to be viewed as being exemplary. Further, examples of the worksite 104 may include, but not limited to, a mine site, an underground mine site, a construction site, a landfill, a quarry, and the like.

Figure 3:
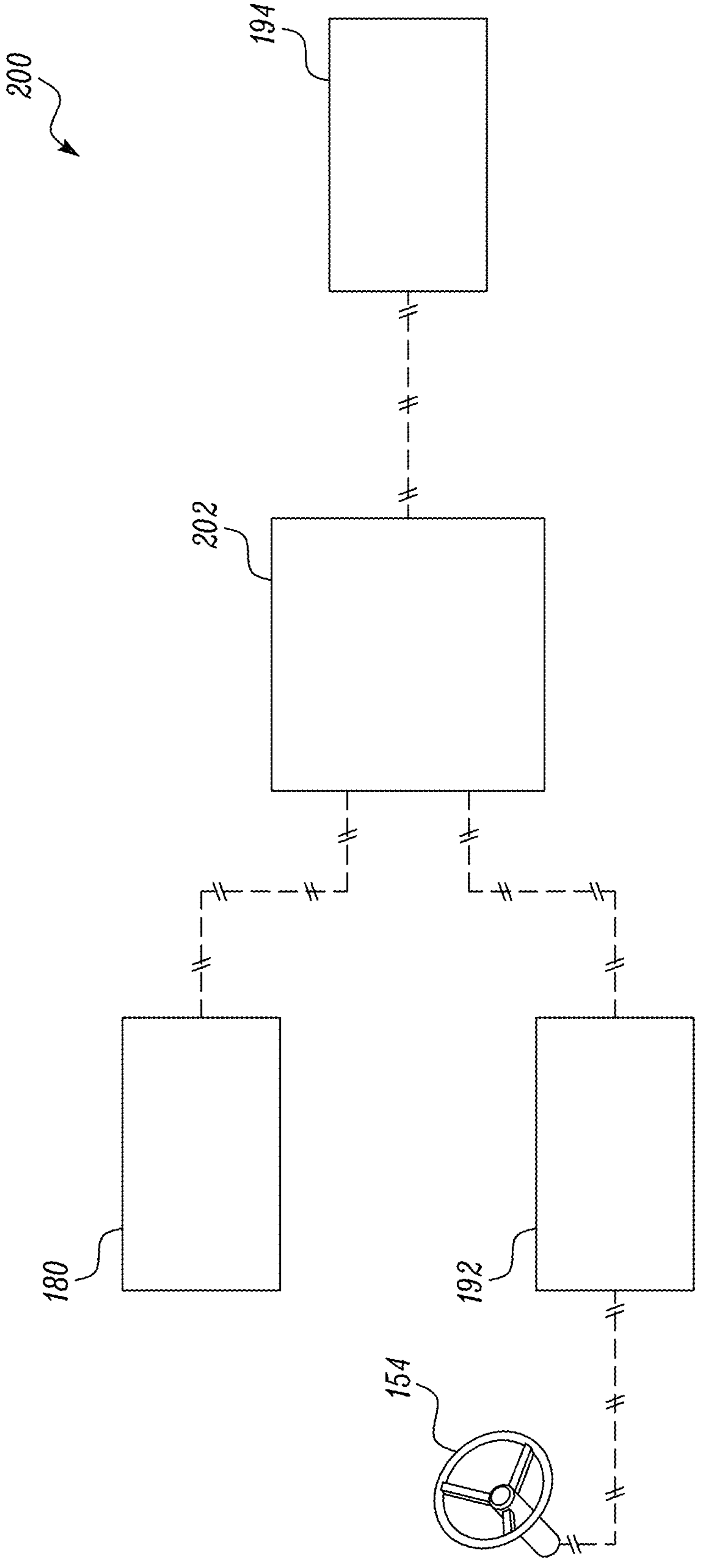
FIG. 3 is a schematic view of the reversing assist system of the mining truck of FIGS. 1 and 2, in accordance with one or more aspects of the present disclosure.

FIG. 3 describes a reversing assist system 200 for the mining truck 100 to assist with reversing of the mining truck 100. The reversing assist system 200 may include the image capturing device 180, the sensor 192, the display screen 194, and a controller 202. Each of the image capturing device 180, the sensor 192, the display screen 194 are operatively coupled to the controller 202. For ease of understanding, the functioning of the controller 202 is described in conjunction with FIGS. 4 and 5 in the forthcoming disclosure.

The controller 202 is configured to obtain a video feed 198 of the wide angled view 182 of the rearward field 184 captured by the image capturing device 180 and overlay a first static indicator 204 and a second static indicator 206 on the video feed 198. In accordance with various embodiments, the first static indicator 204 and the second static indicator 206 are static with respect to the display screen 194. In other words, the first static indicator 204 and the second static indicator 206 may be predefined such that positioning, dimensions, and other such attributes of the first static indicator 204 and the second static indicator 206 remain unchanged on the video feed 198, regardless of a movement of the mining truck 100.

The first static indicator 204 spans, at least partially, an inner distance D between the left rear tire 148 and the right rear tire 148" of the mining truck 100 and is indicative of a location defined at a predefined distance behind the mining truck 100 to indicate positions of rear edges of the left rear tire 148 and the right rear tire 148". As an example, the predefined distance depends on the position of the rear edges of the left rear tire 148' and the right rear tire 148" to give the operator a reference when moving the mining truck 100 in the rearward direction B. For example, when the mining truck 100 is backing up to a berm or a crusher, the predefined distance may provide a reference to the operator when the left rear tire 148' and the right rear tire 148" are about to come into contact so that the operator can move the mining truck 100 accordingly. Although not described, it would be appreciated that the first static indicator 204 may be indicative of a location defined at any known reference in relation to the rear edges of the left rear tire 148' and the right rear tire 148" or in relation to where the left rear tire 148 and the right rear tire 148 contacts the ground surface 144 to provide reference to the operator, as discussed above.

The second static indicator 206 represents portions of the outer periphery 128 of the mining truck 100. To this end, the second static indicator 206 includes laterally separated first static portions 220 and laterally separated second static portions 222. Each of the first static portions 220 corresponds to sections of the rear end 190 of the dump body 108 or a predetermined reference distance behind the mining truck 100 or the dump body 108 of the mining truck 100. As an example, the predetermined reference distance provides an indication in advance to the operator of any possible interference of the dump body 108 with an obstacle during the movement of the mining truck in the rearward direction B. Each of the laterally separated second static portions 222 corresponds to the width W of the mining truck 100. As shown, one first static portion 220' of the laterally separated first static portions 220 is connected with one second static portion 222 of the laterally separated second static portions 222 (e.g., to define a first inverted L-shaped profile 224) and the other first static portion 220" of the laterally separated first static portions 220 is connected with the other second static portion 222" of the laterally separated second static portions 222 (e.g., to define a second inverted L-shaped profile 226).

The controller 202 is configured to overlay a dynamic indicator 208 on the video feed 198. The dynamic indicator 208 dynamically changes to predict a rearward path 210 of the mining truck 100 on the video feed 198 based on an angular movement of the mining truck 100 in the rearward direction, B, FIG. 1. The rearward path 210 corresponds to a path to be followed by the mining truck 100 when the mining truck 100 is moving in the rearward direction, B, FIG. 1. In accordance with various embodiments, the rearward path 210 is determined based on the angular movement of the mining truck 100 in the rearward direction, B, FIG. 1. In some embodiments, the mining truck 100 receives data from the sensor 192 associated with the steering input device 154 to predict the rearward path 210 of the mining truck 100. In some other embodiments, the rearward path 210 of the mining truck 100 may be determined based on positioning of the front tires 146 and/or a component such as a steering linkage (not shown) operably applied between the steering input device 154 and the front tires 146. The dynamic indicator 208 is dynamic with respect to the display screen 194 and the attributes of the dynamic indicator 208 may change with time.

In some embodiments, the controller 202 is configured to change a position of the dynamic indicator 208 on the video feed 198 based on the change in the angular positioning of the steering input device 154 of the mining truck 100. To this end, the controller 202 is configured to receive data associated with the change in the angular positioning of the steering input device 154 from the sensor 192 and determine a corresponding change in the position of the dynamic indicator 208 on the video feed 198. In some embodiments, the controller 202 may determine the rearward path 210 of the mining truck 100 based on the positioning of the front tires 146 and/or the component such as the steering linkage (not shown) operably applied between the steering input device 154 and the front tires 146. For example, FIG. 5 represents a change in the positioning of the dynamic indicator 208 as compared to the positioning of the dynamic indicator 208 in FIG. 4.

The controller 202 is configured to control the display screen 194 to display the first static indicator 204, the second static indicator 206, and the dynamic indicator 208 on the video feed 198. In some embodiments, the controller 202 is configured to display any combination of the first static indicator 204, the second static indicator 206, and the dynamic indicator 208 on the video feed 198 on the display screen 194 based on a preference of the operator of the mining truck 100. In some embodiments, the controller 202 is configured to disable the display of the first static indicator 204, the second static indicator 206, and the dynamic indicator 208 on the video feed 198 on the display screen 194 based on a preference of the operator of the mining truck 100. Upon receiving instructions from the controller 202, the display screen 194 is configured to display the first static indicator 204, the second static indicator 206, and the dynamic indicator 208 on the video feed 198.

The controller 202 may be one or more processor, a microprocessor, a microcontroller, an electronic control module (ECM), an electronic control unit (ECU), or any other suitable means for assisting with reversing the mining truck 100. The controller 202 may be implemented using one or more controller technologies, such as Application Specific Integrated Circuit (ASIC), Reduced Instruction Set Computing (RISC) technology, Complex Instruction Set Computing (CISC) technology or any other similar technology now known or developed in the future.

INDUSTRIAL APPLICABILITY

FIG. 6 describes an exemplary method 600 for assisting with the reversing of the mining truck 100. The method 600 includes, at step 602, mounting the image capturing device 180 to capture the wide angled view 182 of the rearward field 184 of the mining truck 100. At step 604, the controller 202 obtains the video feed 198 of the wide angled view 182 of the rearward field 184 captured by the image capturing device 180. At step 606, the controller 202 overlays the first static indicator 204 and the second static indicator 206 on the video feed 198. At step 608, the controller 202 overlays the dynamic indicator 208 on the video feed 198 that dynamically changes to predict the rearward path of the mining truck 100 on the video feed 198 based on the angular movement of the mining truck 100 in the rearward direction (See, direction, B, FIG. 1).

The system 200 and method 600 of present disclosure provide a better wide angled view 182 of the rearward field 184 of the mining truck 100 to an operator of the mining truck 100 during the movement of the mining truck 100 in the rearward direction, B. By overlaying the first static indicator 204 on the video feed 198, as an example, the wide angled view 182 of the rearward field 184 provides an indication of whether an obstacle is present between the rear traction devices 136" and/or whether such an obstacle is able to safely clear the distance D between the left rear tire 148 and the right rear tire 148". By overlaying the second static indicator 206 on the video feed 198, as an example, the wide angled view 182 of the rearward field 184 provides an indication of the dimensions and/or physical extents (e.g., the width, W, the rear end 190 of the dump body 108, and the rear end 112) of the mining truck 100, thus helping an operator of the mining truck 100 gauge an extent to which the mining truck 100 can be moved (e.g., in the rearward direction, B) without interfering with the surrounding environment. Further, by overlaying the dynamic indicator 208 on the video feed 198, as an example, the rearward path 210 of the mining truck 100 can be displayed to the operator, thus helping the operator to judiciously (and angularly) maneuver the mining truck 100 in the rearward direction, B.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A reversing assist system for a mining truck, the reversing assist system comprising:

an image capturing device to capture a wide angled view of a rearward field of the mining truck including portions of at least two rear tires of the mining truck and portions of a rear end of a dump body of the mining truck; and a controller operatively coupled to the image capturing device, the controller configured to:

obtain a video feed of the wide angled view of the rearward field captured by the image capturing device;

overlay a first static indicator and a second static indicator on the video feed, wherein the first static indicator spans, at least partially, an inner, lateral distance between the at least two rear tires of the mining truck and the second static indicator represents portions of an outer periphery of the mining truck, the second static indicator including a pair of corner indicators representative of laterally opposite corners of the rear end of the dump body of the mining truck or a predetermined reference distance from the corners of the rear end of the dump body, the pair of corner indicators being laterally spaced from one another and representing a width of the mining truck, the second static indicator including a gap between the pair of corner indicators to provide an unobstructed area of the video feed laterally between the corner indicators; and overlay a dynamic indicator on the video feed that dynamically changes to predict a rearward path of the mining truck on the video feed based on an angular movement of the mining truck in a rearward direction.

2. The reversing assist system of claim 1, further includes:

a display screen configured to display the first static indicator, the second static indicator, and the dynamic indicator on the video feed, wherein the first static indicator and the second static indicator are static with respect to the display screen, and the dynamic indicator is dynamic with respect to the display screen.

3. The reversing assist system of claim 1, wherein the pair of corner indicators include laterally separated first static portions, each corresponding to the rear end of the dump body or a predetermined reference distance behind the mining truck, and laterally separated second static portions corresponding to the width of the mining truck, wherein the first static indicator is indicative of a location defined at a predefined distance behind the mining truck to indicate positions of rear edges of the at least two rear tires.

4. The reversing assist system of claim 3, wherein one first static portion of the laterally separated first static portions is connected with one second static portion of the laterally separated second static portions to form a first inverted L-shaped profile and the other first static portion of the laterally separated first static portions is connected with the other second static portion of the laterally separated second static portions to form a second inverted L-shaped profile.

5. The reversing assist system of claim 1, wherein the controller is configured to change a position of the dynamic indicator on the video feed based on one or more of: a change in an angular positioning of a steering input device of the mining truck, positioning of front tires, or positioning of a component operably applied between the steering input device and the front tires.

6. The reversing assist system of claim 1, wherein the image capturing device is positioned under the dump body of the mining truck.

7. The reversing assist system of claim 1, wherein the image capturing device is mounted between the at least two rear tires of the mining truck.

8. A method for assisting with reversing a mining truck, the method comprising:

mounting an image capturing device to capture a wide angled view of a rearward field of the mining truck including portions of at least two rear tires of the mining truck and portions of a rear end of a dump body of the mining truck;

obtaining, by a controller, a video feed of the wide angled view of the rearward field captured by the image capturing device;

overlaying, by the controller, a first static indicator and a second static indicator on the video feed, wherein the first static indicator spans, at least partially, an inner, lateral distance between the at least two rear tires of the mining truck and the second static indicator represents portions of an outer periphery of the mining truck, the second static indicator including a pair of corner indicators representative of laterally opposite corners of the rear end of the dump body of the mining truck or a predetermined reference distance from the corners of the rear end of the dump body, the pair of corner indicators being laterally spaced from one another and representing a width of the mining truck, the second static indicator including a gap between the pair of corner indicators to provide an unobstructed area of the video feed laterally between the corner indicators; and overlaying, by the controller, a dynamic indicator on the video feed that dynamically changes to predict a rearward path of the mining truck on the video feed based on an angular movement of the mining truck in a rearward direction.

9. The method of claim 8, further including:

displaying, on a display screen, the first static indicator, the second static indicator, and the dynamic indicator on the video feed, wherein the first static indicator and the second static indicator are static with respect to the display screen, and the dynamic indicator is dynamic with respect to the display screen.

10. The method of claim 8, wherein the pair of corner indicators include laterally separated first static portions, each corresponding to the rear end of the dump body or a predetermined reference distance behind the mining truck, and laterally separated second static portions corresponding to the width of the mining truck, wherein the first static indicator is indicative of a location defined at a predefined distance behind the mining truck to indicate positions of rear edges of the at least two rear tires.

11. The method of claim 10, wherein one first static portion of the laterally separated first static portions is connected with one second static portion of the laterally separated second static portions to form a first inverted L-shaped profile and the other first static portion of the laterally separated first static portions is connected with the other second static portion of the laterally separated second static portions to form a second inverted L-shaped profile.

12. The method of claim 8, further including:

changing, by the controller, a position of the dynamic indicator on the video feed based on one or more of: a change in an angular positioning of a steering input device of the mining truck, positioning of front tires, or positioning of a component operably applied between the steering input device and the front tires.

13. The method of claim 8, wherein the image capturing device is positioned under the dump body of the mining truck.

14. The method of claim 8, wherein the image capturing device is mounted between the at least two rear tires of the mining truck.

15. A mining truck comprising:

at least two rear tires;

a dump body supported on the at least two rear tires, the dump body defining a rear end; and a reversing assist system including:

an image capturing device to capture a wide angled view of a rearward field of the mining truck including portions of the at least two rear tires of the mining truck and portions of the rear end; and a controller operatively coupled to the image capturing device, the controller configured to:

obtain a video feed of the wide angled view of the rearward field captured by the image capturing device;

overlay a first static indicator and a second static indicator on the video feed, wherein the first static indicator spans, at least partially, an inner, lateral distance between the at least two rear tires of the mining truck and the second static indicator represents portions of an outer periphery of the mining truck, the second static indicator including a pair of corner indicators representative of laterally opposite corners of the rear end of the dump body of the mining truck or a predetermined reference distance from the corners of the rear end of the dump body, the pair of corner indicators being laterally spaced from one another and representing a width of the mining truck, the second static indicator including a gap between the pair of corner indicators to provide an unobstructed area of the video feed laterally between the corner indicators; and overlay a dynamic indicator on the video feed that dynamically changes to predict a rearward path of the mining truck on the video feed based on an angular movement of the mining truck in a rearward direction.

16. The mining truck of claim 15, wherein the reversing assist system further includes:

a display screen configured to display the first static indicator, the second static indicator, and the dynamic indicator on the video feed, wherein the first static indicator and the second static indicator are static with respect to the display screen, and the dynamic indicator is dynamic with respect to the display screen.

17. The mining truck of claim 15, wherein the pair of corner indicators include laterally separated first static portions, each corresponding to the rear end of the dump body or a predetermined reference distance behind the mining truck, and laterally separated second static portions corresponding to the width of the mining truck, wherein the first static indicator is indicative of a location defined at a predefined distance behind the mining truck to indicate positions of rear edges of the at least two rear tires, and wherein one first static portion of the laterally separated first static portions is connected with one second static portion of the laterally separated second static portions to form a first inverted L-shaped profile and the other first static portion of the laterally separated first static portions is connected with the other second static portion of the laterally separated second static portions to form a second inverted L-shaped profile.

18. The mining truck of claim 15, wherein the controller is configured to change a position of the dynamic indicator on the video feed based on one or more of: a change in an angular positioning of a steering input device of the mining truck, positioning of front tires, or positioning of a component operably applied between the steering input device and the front tires.

19. The mining truck of claim 15, wherein the image capturing device is positioned under the dump body of the mining truck.

20. The mining truck of claim 15, wherein the image capturing device is mounted between the at least two rear tires of the mining truck.

* * * * *